April 28, 1942.  M. H. PITCHER  2,280,847
APPARATUS FOR FORMING HELICAL PLOW SCREWS
Filed July 12, 1940  2 Sheets-Sheet 1
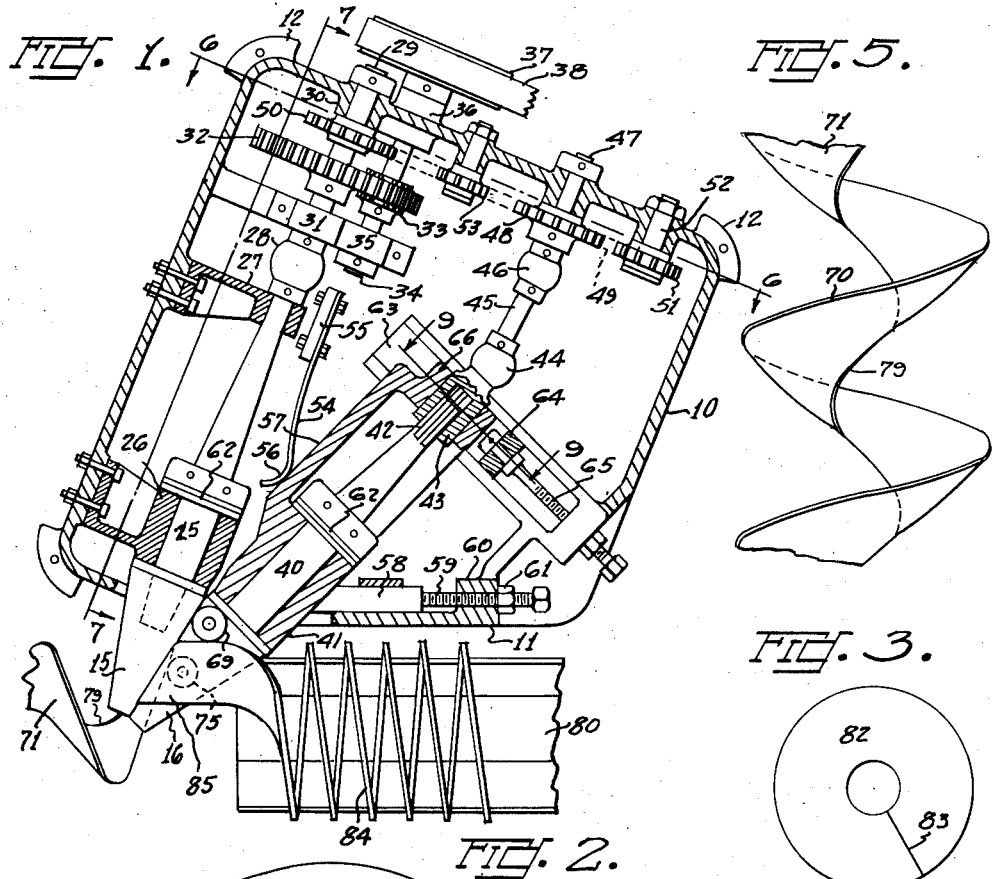
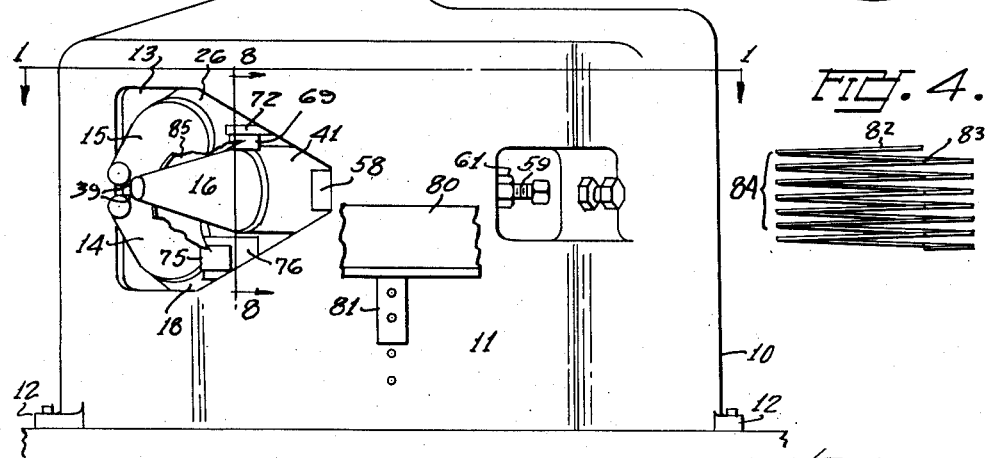
INVENTOR
MILES H. PITCHER
BY
ATTORNEY April 28, 1942.   M. H. PITCHER   2,280,847
APPARATUS FOR FORMING HELICAL PLOW SCREWS
Filed July 12, 1940   2 Sheets-Sheet 2
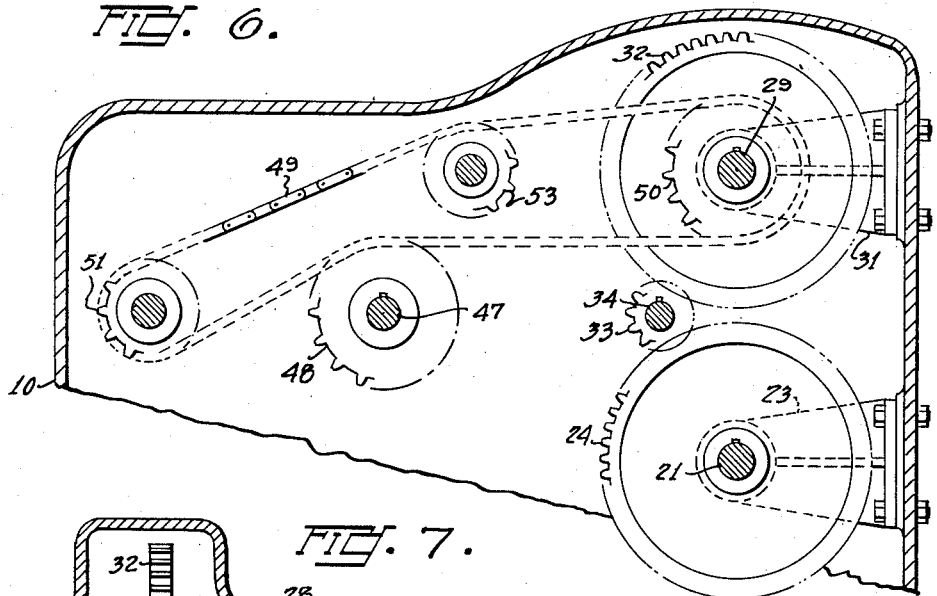
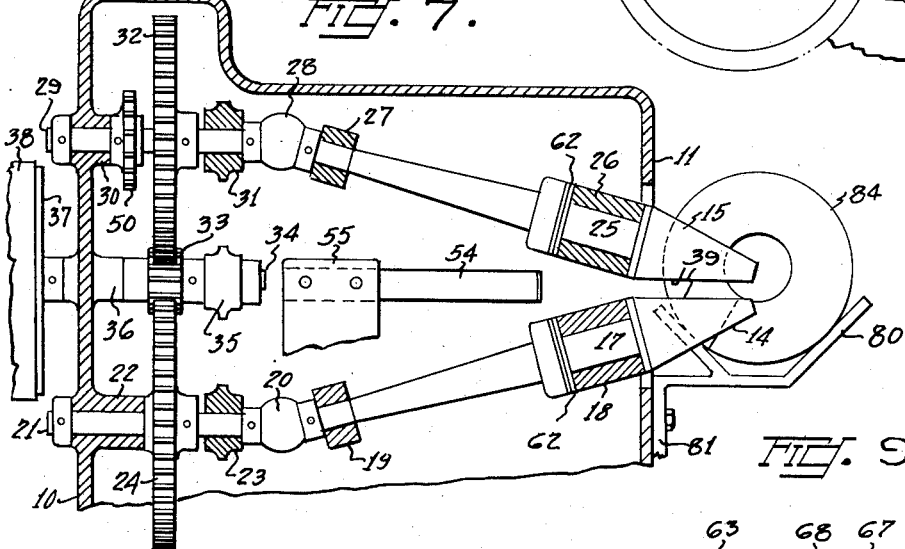
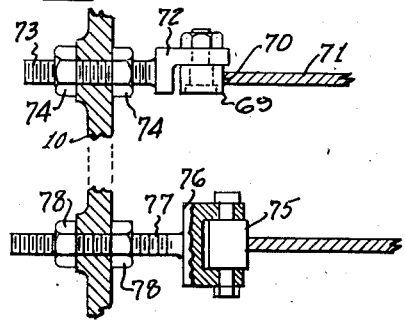
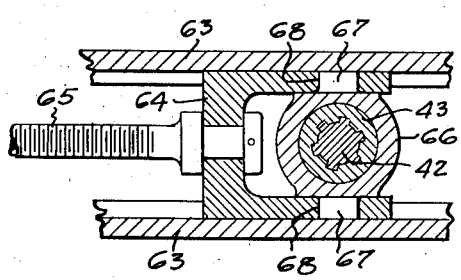
INVENTOR
MILES H. PITCHER
ATTORNEY Patented Apr. 28, 1942

2,280,847

UNITED STATES PATENT OFFICE 2,280,847

APPARATUS FOR FORMING HELICAL PLOW SCREWS

Miles H. Pitcher, Portland, Oreg.

Application July 12, 1940, Serial No. 345,128

3 Claims. (Cl. 80—31.1)

This invention relates generally to the manufacture of conveyor flights, and particularly to a method of and apparatus for forming helical plow screws.

The main object of this invention is to construct an apparatus and develop a method for easily forming helical screws especially adapted for use in rotary plows, such as are illustrated in the patent of Bagan, No. 1,776,612.

The second object is to construct a machine of the class described whereby the radial curvature of the flight as well as the pitch thereof may be varied at will.

These and other objects are accomplished in the manner set forth in the following specification as illustrated in the accompanying drawings, in which:

Fig. 1 is a horizontal section through the apparatus taken along the line 1—1 in Fig. 2.

Fig. 2 is a front elevation of the device.

Fig. 3 is a plan of a representative form of blank made from sheet steel.

Fig. 4 is a side elevation showing a plurality of blanks welded together along their radial edges forming a helix having a small pitch and with the flight thereof unformed.

Fig. 5 is a fragmentary side elevation of a formed helical plow screw indicating the manner in which the helix shown in Fig. 4 appears after it has passed through my machine.

Fig. 6 is a fragmentary section taken along the line 6—6 in Fig. 1.

Fig. 7 is a fragmentary section taken along the line 7—7 in Fig. 1.

Fig. 8 is a fragmentary section taken along the line 8—8 in Fig. 2 showing the position of the rollers which engage the edges of the plow screw.

Fig. 9 is a fragmentary section taken along the line 9—9 in Fig. 1.

Similar numerals refer to similar parts throughout the several views.

Referring in detail to the drawings, there is shown a somewhat rectangular upright frame 10 having its side 11 inclined with relation to the remaining sides. The frame 10 is provided with feet 12 by means of which the machine may be secured to a suitable foundation.

Through the side 11 is formed an opening 13 through which projects the fixed conical rolls 14 and 15 and the adjustable roll 16. The lower roll 14 is mounted on a spindle 17 which journals in the bearings 18 and 19 which are secured to the frame 10. The spindle 17 is connected by means of a universal joint 20 to the shaft 21 which journals in the bearing 22 formed in the frame 10. The shaft 21 is also supported by the bearing 23 which is mounted on the frame 10. A gear 24 is secured to the shaft 21.

The conical roll 15 is mounted on a spindle 25 which journals in the bearings 26 and 27, both of which are attached to the frame 10. The spindle 25 is connected by the universal joint 28 to the shaft 29 which journals in the bearing 30 forming part of the frame 10, and the shaft 29 also journals in the bearing 31 which is attached to the frame 10. On the shaft 29 is secured a gear 32.

The gears 24 and 32 mesh with an intermediate pinion 33 which is secured on the shaft 34 which journals in the bearings 35 and 36 and is driven from the pulley 37 through a belt 38 from a convenient source of power. The adjacent faces 39 of the rolls 14 and 15 are substantially parallel and spaced from each other.

The adjustable roll 16 is mounted on a spindle 40 which journals in a floating frame 41 and has its end 42 splined within the end 43 of the universal coupling 44 which is connected by means of the stub shaft 45 and the second universal coupling 46 to the shaft 47 which journals in the frame 10. On the shaft 47 is secured a sprocket wheel 48 whose chain 49 passes around the sprocket wheel 50 secured to the shaft 29 and around the idler sprocket wheel 51 which is rotatably mounted on the bolt 52. An idler sprocket wheel 53 is employed under the upper run of the chain 49.

A flat spring 54 is secured to the stationary bracket 55 and the spring end 56 bears against the side 57 of the floating frame 41 and urges the roll 16 away from the rolls 14 and 15 against the slidable stop 58 which is adjustably held by means of the screw 59 which is threaded through the frame lug 60 and locked in position by means of the nut 61. Suitable thrust bearings 62 are provided for the various spindles 17, 25, and 40.

In Fig. 9 is shown a pair of guides 63 between which is mounted a slide 64 whose position may be adjusted by means of the screw 65. The slide 64 has pivotally mounted therein the end 66 of the floating frame 41. The trunnions 67 of the end 66 journal in openings 68 formed within the slide 64.

It can be seen that by rotating the screws 59 and 65 that the angular as well as the spaced relationship between the spindle 40 and the spindles 17 and 25 may be varied at will and that this relationship may be easily fixed.

It will be noted in Fig. 8 that there is shown a roller 69 which guides against the outer edge 70 of the plow screw 71. The roller 69 is mounted on the head 72 of the adjusting screw 73 which passes through the frame 10 and is held in relation thereto by the nuts 74. There is also shown a roller 75 which is carried by the head 76 of the adjusting screw 77 which passes through the frame 10 and is held in relation thereto by means of the nuts 78. The roller 75 engages the outer edge 70 of the plow screw 71.

There is shown in Figs. 1 and 2 a trough 80 which is adjustably supported on the bracket 81. The trough 80 is of a nature to support the blanks 82 which have been slit along the line 83 and welded together into helical form as shown in Fig. 4.

The operation of the device is as follows:

The joined blanks 82 will be referred to as the unformed screw 84 which is placed in the trough 80 and the end 85 is passed downwardly between the rolls 14, 15 and 16 causing the formation of the helix 71, that is, the plow screw shown in Fig. 5. The spacing of the rolls 14, 15 and 16 and the relation of the rollers 69 and 75 is such that a screw of extremely accurate form is produced and also that there is a slight radial curvature to the flight of the helix which is essential for plowing purposes.

It is obvious that the diameters of the screw 71 across the outer edge 70 as well as the inner edge 79 is less than the corresponding diameters of the blanks 82.

I claim:

1. An apparatus of the class described having in combination three tapering driven rolls, the axes of which converge normally toward a common point, the axes of two of said rolls being fixed while the axis of the third roll is adjustable in a plane normal to and intersecting a plane passing through the axes of said fixed rolls and guide rolls associated with said adjustable tapering roll constituting guides for work passing between said tapering rolls for the purpose of controlling the angular position of the work as it passes between said tapering rolls.

2. In an apparatus of the class described, the combination of a frame, a pair of converging tapering rolls rotatably mounted on said frame on fixed axes, a third tapering roll adjustable with relation to said first mentioned rolls as to spacing and angularity, said adjustment being in a plane substantially normal to a plane passing through the axes of said fixed rolls, means for driving all of said rolls simultaneously, means for adjusting said adjustable roll, and means for controlling the angle at which work is passed between said rolls.

3. The apparatus described in claim 2, together with a spring for urging said adjustable roll away from said fixed rolls.

MILES H. PITCHER.